United States Patent [19]

McGovern et al.

[11] Patent Number: 5,050,696
[45] Date of Patent: Sep. 24, 1991

[54] SECONDARY HYDRAULIC STEERING SYSTEM

[75] Inventors: Donald E. McGovern; Stanley L. Irwin, both of Dubuque, Iowa

[73] Assignee: Deere & Company, Moline, Ill.

[21] Appl. No.: 260,158

[22] Filed: Oct. 20, 1988

[51] Int. Cl.⁵ .......................................... B62D 5/097
[52] U.S. Cl. .................................. 180/133; 180/132; 180/152; 418/613
[58] Field of Search .............. 180/143, 132, 140, 13.3, 180/266, 152, 312; 418/61.3

[56] References Cited

U.S. PATENT DOCUMENTS

| | | | |
|---|---|---|---|
| 3,811,699 | 5/1974 | Casey | 180/266 |
| 3,870,172 | 3/1975 | Huber | 180/132 |
| 4,109,679 | 8/1978 | Johnson | 137/596 |
| 4,470,260 | 9/1984 | Miller et al. | 180/132 |
| 4,480,971 | 11/1984 | Swedberg | 418/61.3 |
| 4,493,622 | 1/1985 | Miller | 418/57 |
| 4,809,586 | 3/1989 | Gage et al. | 91/6 |
| 4,838,314 | 6/1989 | Gage | 137/625.24 |

Primary Examiner—Charles A. Marmor
Assistant Examiner—Anne Marie Boehler

[57] ABSTRACT

A secondary hydraulic steering system being automatically triggered and manually actuated. The steering system is provided with a dual displacement fluid meter having a fluid pressure sensing valve for selecting the operational configuration in which the fluid meter is operated. The fluid pressure sensing valve is hydraulically coupled to the source of pressurized fluid and in response to a loss of fluid pressure shifts the dual displacement fluid meter into a reduced displacement configuration so that the operator has greater mechanical advantage.

14 Claims, 2 Drawing Sheets

5,050,696

SECONDARY HYDRAULIC STEERING SYSTEM

BACKGROUND OF THE INVENTION

1. Field of the Invention

The invention is directed to a secondary hydraulic steering system for steering a large work vehicle when hydraulic pressure is lost.

2. Description of the Prior Art

Large articulated work vehicles, such as four-wheel drive loaders, four-wheel drive tractors, logging skidders, and other vehicles, use hydraulic systems to articulate and steer the vehicle. Such systems are well known in the art, as disclosed in U.S. Pat. No. 4,109,679. Typically these systems are provided with a hydraulic controller which is coupled to a steering wheel and in response to manipulation of the steering wheel controls the output of pressurized hydraulic fluid to steering cylinders. The hydraulic controller typically comprises a fluid meter and valve structure that are operatively coupled to one another by a mechanical follow-up connection, the fluid meter being formed from a gerotor.

To assure continued steerability of a large work vehicle when hydraulic pressure is lost, these vehicles may be provided with secondary hydraulic pressure systems. One such secondary hydraulic pressure system comprises an electrically powered pump that supplies pressurized hydraulic fluid to the steering circuit when a loss of hydraulic pressure is detected. Another secondary hydraulic pressure steering system comprises hydraulic accumulators for storing hydraulic pressure until needed. With smaller work vehicles, however, secondary hydraulic pressure systems may not be needed Smaller work vehicles can be manually steered by the operator even when hydraulic pressure is lost. This is accomplished because the fluid meter of the controller acts as a pump, supplying hydraulic fluid to the steering cylinders Such a manual system is ineffective with larger vehicles due to the size of the fluid meter.

Gerotors having more than one operational configuration are known in the art as disclosed in U.S. Pat. Nos. 4,480,971 and 4,493,622. More specifically these motors can be operated in a full displacement configuration, or a reduced displacement configuration, depending upon the selected operational configuration. The Eaton Corporation, Hydraulics Division, of Eden Prairie, Minn., is currently marketing a dual displacement motor similar to the one disclosed in the U.S. Pat. No. 4,480,971. This motor is provided with a two-position pilot spool for selecting the operational displacement configuration.

SUMMARY OF THE INVENTION

It is the object of the present invention to provide a simple secondary steering system that is automatically triggered and manually manipulated.

The present invention comprises a steering controller having a dual displacement fluid meter and a two-position fluid pressure sensing valve. Typically the fluid meter is operated in a full displacement configuration, however, when hydraulic pressure is lost the fluid pressure sensing valve shifts, restricting fluid flow to some of the input ports of the fluid meter so that it is operated in its reduced displacement configuration. In the reduced displacement configuration the operator's mechanical advantage is increased allowing the operator to manually steer the vehicle.

DETAILED DESCRIPTION OF THE PREFERRED EMBODIMENT LOADER

Figure 1:
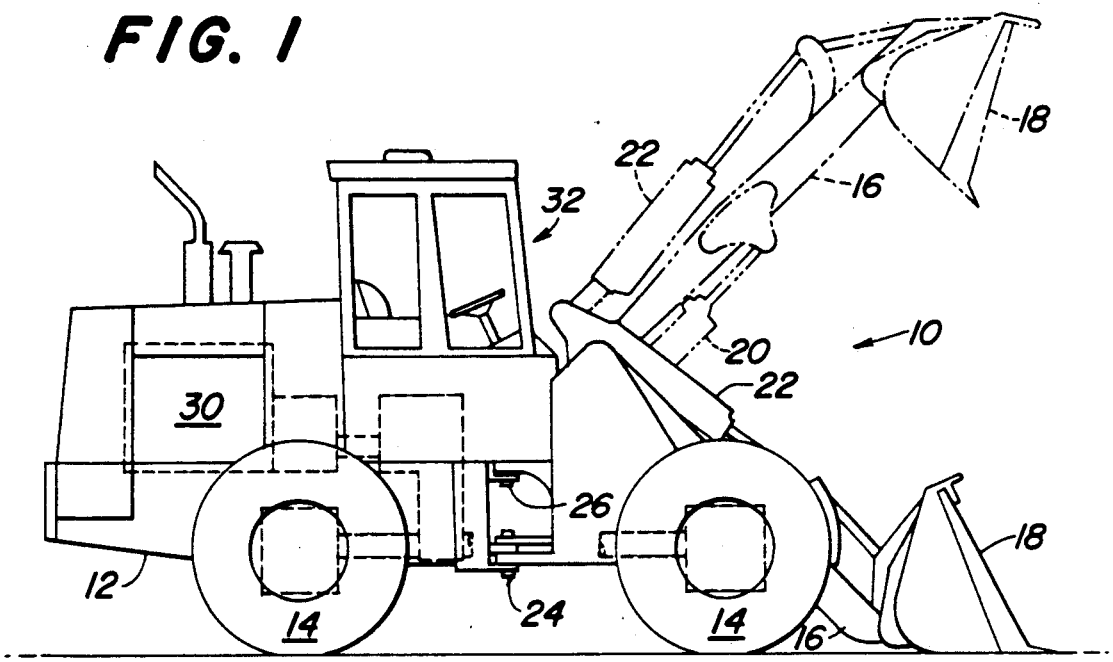
FIG. 1 is a side view of an articulated loader on which the present invention can be used.

The loader illustrated in FIG. 1 is a four-wheel drive articulated loader. Loader 10 comprises a supporting structure 12 having ground-engaging wheels 14. The front of the loader is provided with a movable boom assembly 16 at the end of which is pivotally mounted bucket 18. The boom is lifted by extending boom-lift actuator 20, and the bucket is pivoted by bucket-tilt actuator 22.

Figure 3:
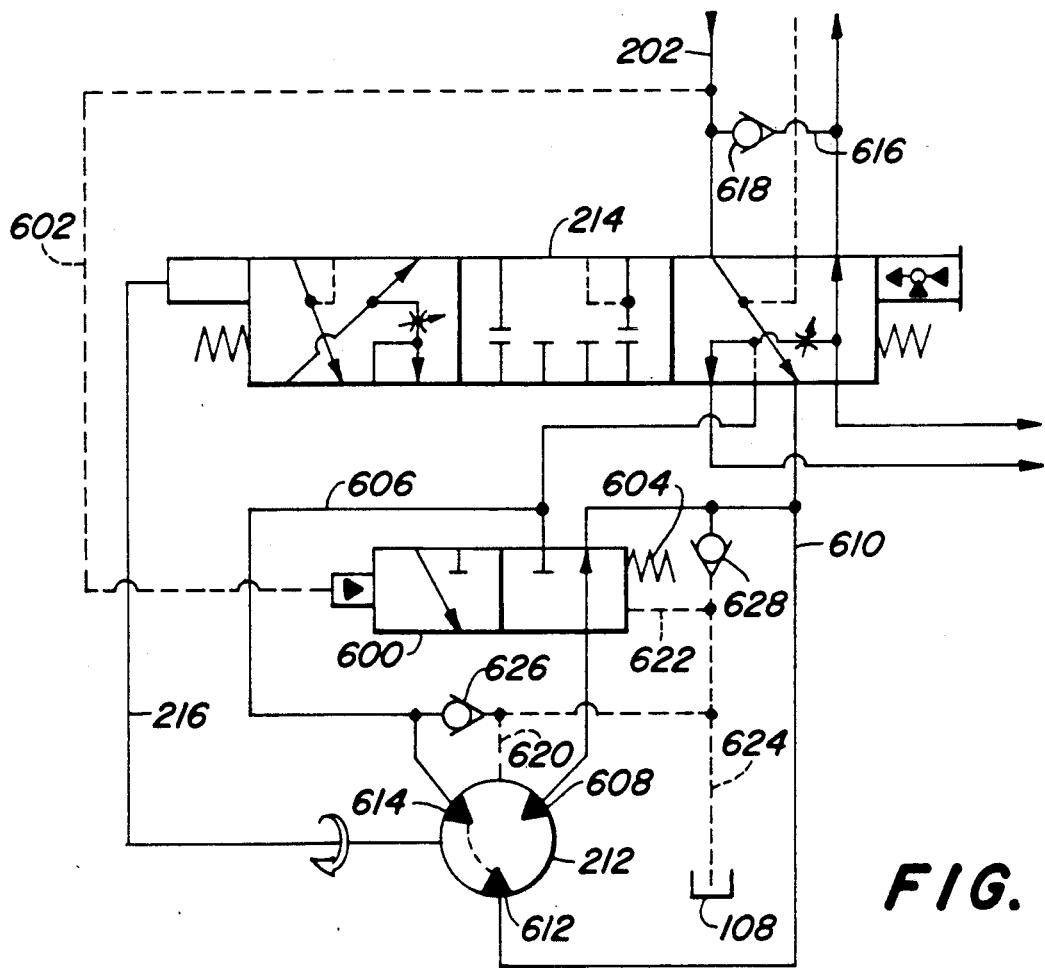
FIG. 3 is a detailed hydraulic schematic of the present invention in a secondary steering system.
Figure 2:
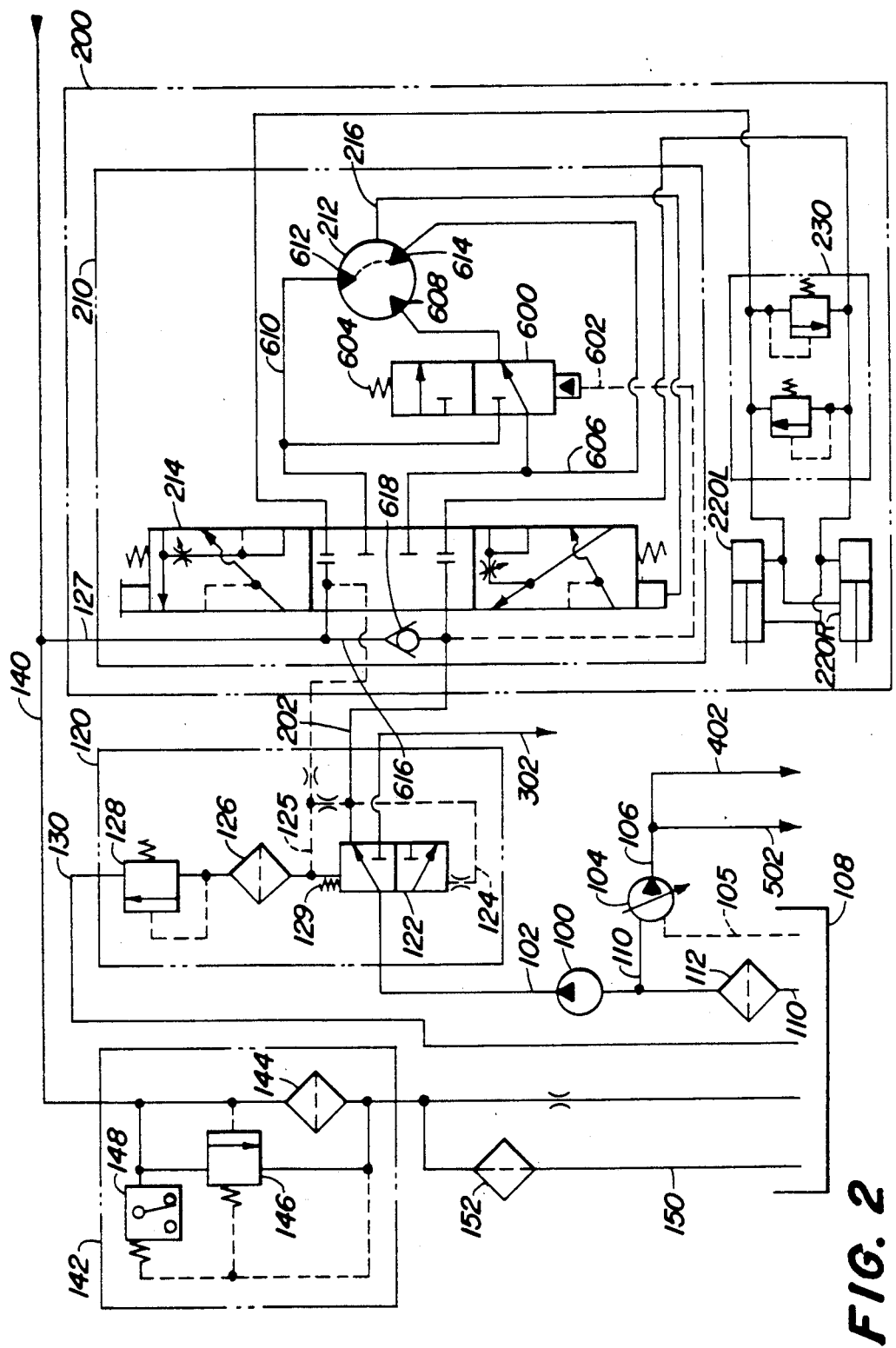
FIG. 2 is a hydraulic schematic of the hydraulic system in which the present invention is located.

The loader is articulated about vertical pivots 24 and 26 by a hydraulic steering circuit schematically illustrated in FIGS. 2 and 3. The loader is driven by internal combustion engine 27 that is housed in engine compartment 30. The internal combustion engine also drives hydraulic pumps 28 for driving the working circuits of the loader and other hydraulically actuated systems. The operator controls the operation of the loader from cab 32. The internal combustion engine also drives transmission 29 for rotating wheels 14 propelling the vehicle.

Although the present invention is being described in regards to a loader, it may also be used in other large work vehicles and in other non-vehicle applications.

Hydraulic System

The overall hydraulic steering system is schematically illustrated in FIG. 2, comprising an open center hydraulic system and a closed center hydraulic system. The total hydraulic system for the loader is disclosed in U.S. Pat. application, Ser. No. 076,574, filed Sept. 11, 1987 now U.S. Pat. No. 4,809,586, assigned to the present assignee and incorporated herein by reference. The open center hydraulic system is provided with hydraulic fluid by fixed displacement pump 100 which pumps hydraulic fluid through hydraulic line 102. The closed center hydraulic system is provided with hydraulic fluid by variable displacement pump 104 which is provided with a pressure sensing and compensating assembly for maintaining constant pressure in hydraulic line 106. Pump 104 is also provided with drain path 105 for returning leaking hydraulic fluid back to the sump. Both pumps are operatively interconnected in a piggybacked fashion to provide a compact pumping unit. The pumps are driven by the internal combustion engine through a suitable mechanical coupling.

The pumps draw hydraulic fluid from common sump 108 through a common hydraulic fluid suction line 110. Line 110 is provided with a screen 112 for removing large particulates from the hydraulic fluid being directed to pumps 100 and 104.

The hydraulic fluid output of pump 100 is directed through line 102 to priority valve assembly 120 which prioritizes fluid flow between steering assembly 200 and the loader assembly which is fluidically coupled to line 302. The priority valve assembly gives priority to the steering assembly, shutting off hydraulic fluid flow to the loader assembly in response to fluid demands of the steering assembly. The priority valve assembly comprises a spring biased two-position spool 122 that selectively directs fluid between the steering and loader assemblies. Spool 122 is hydraulically balanced between restricted hydraulic pressure sensing lines 124 and 125. When steering valve 210 is centered in a neutral position, hydraulic flow from supply line 202 through valve 210 is stopped, increasing hydraulic pressure in line 202 and sensing line 124. In the centered position, valve 210 couples sensing line 125 to sump return line 140 through line 127 reducing hydraulic pressure in sensing line 125. As such, the increased hydraulic pressure in line 124 overcomes the hydraulic pressure in line 125 and the biasing force of spring 129 to position spool 122 so that it can transmit hydraulic fluid to loader assembly supply line 302.

The priority valve assembly is also provided with a filter 126 and pressure relief valve 128 through which hydraulic fluid can be directed to sump return line 130. The sump return line receives hydraulic fluid from sensing line 125.

Hydraulic fluid exhausted from steering assembly 200 and the loader assembly is directed by sump return line 140 to sump 108. Sump return line 140 is provided with a return filter assembly 142 having filter 144, hydraulically balanced pressure relief valve 146 and hydraulically balanced pressure sensitive electrical switch 148. Hydraulic fluid is typically filtered by the filter and returned to sump 108. However, as the filter collects foreign material, the hydraulic pressure drop across the filter increases closing electrical switch 148. Upon the closing of electrical switch 148, an indicator light is triggered in the operator cab of the loader, alerting the operator that filter 144 should be cleaned or replaced. As the pressure drop continues to increase because of additional foreign material collected on the filter, pressure relief valve 146 opens thereby providing a hydraulic flow path that bypasses the filter.

Hydraulic fluid sump return line 150 located downstream of the filter assembly is provided with oil cooler 152 for cooling oil being returned to sump 108.

The hydraulic fluid output of pump 104 is directed to a hydraulic pressure reduction assembly through hydraulic fluid supply line 402; and a brake assembly through hydraulic fluid supply line 502.

Steering assembly 200 receives hydraulic fluid through hydraulic line 202 from priority valve assembly 120. The hydraulic fluid is directed to infinitely variable steering control valve 210. Control valve 210 comprises multi-displacement fluid meter 212 and valve structure 214 which are operatively coupled to one another by mechanical follow up connection 216. Valve structure 214 comprises a main fluid path and may comprise a dampening fluid path. The dampening fluid path comprises a number of restricted passages that are used to dampen pressure spikes in the main fluid path.

The main fluid path directs hydraulic fluid to steering hydraulic cylinders 220R and 220L for assisting in steering the loader. Crossover relief valves 230 are hydraulically located between control valve 210 and the steering cylinders 220R and 220L for providing pressure relief for the system.

Hydraulic Secondary Steering Circuit

As illustrated in FIGS. 2 and 3, multi-displacement fluid meter 212 is provided with a two-position fluid pressure sensing valve 600 which is coupled through fluid sensing path 602 to hydraulic pressure line 202. The valve is biased by a biasing means comprising spring 604, into a first position, illustrated in FIG. 3. The hydraulic pressure in fluid sensing path 602 drives valve 600 against spring 604 into its second position illustrated in FIG. 2. In this second position hydraulic supply/return line 610 is fluidically coupled to port 612 and supply return line 606 is fludically coupled to ports 608 and 614, thus, matching the fluid displacement of port 612. In this normal operational configuration, the fluid meter is operated in a full displacement mode so that the steering will be more quickly responsive.

When hydraulic pressure is lost in hydraulic pressure line 202 the hydraulic pressure in fluid sensing path 602 is no longer sufficient to overcome spring 604. As such the valve spool is shifted into its first position, illustrated in FIG. 3, wherein hydraulic supply/return line 606 is no longer fluidically coupled to port 608 and 614 but is only fluidically coupled to port 614. Similarly hydraulic supply/return line 610 is now hydraulically coupled to both ports 608 and 612 reducing the effective fluid displacement of port 612 to match the fluid displacement of port 614. In this operational configuration, the fluid meter is operated in a reduced displacement mode so that the operator will have more mechanical advantage in driving the fluid meter and supplying pressurized hydraulic fluid to the steering cylinders. The fluid pressure sensing valve 600 provides a means for automatically switching the operational configuration of the multi-displacement fluid meter. In this way, when fluid pressure is lost, the multi-displacement fluid meter is automatically shifted to its reduced displacement configuration to increase the operator's mechanical advantage.

The primary fluid paths through the fluid meter are illustrated in dashed lines. More specifically, fluid can be moved back and forth between ports 612 and 614 or between port 612 and 614 and 608 combined, but not between port 608 and 614.

To prevent cavitation when operating the fluid meter in the secondary steering mode, hydraulic fluid must be supplied to the fluid meter. Fluid is supplied from reservoir 108 through sump return line 140 and hydraulic line 127, to fluid supply path 616 having check valve 618 to prevent hydraulic short circuiting of the controller when the steering is operated in its normal mode. Hydraulic fluid is drawn through lines 140, 127 and 616 by fluid meter 212 to steering cylinders 220R and 220L.

As illustrated in the more detailed hydraulic schematic, FIG. 3, fluid meter 212 and valve 600 are provided with drain lines 620 and 622, respectively, that are hydraulically coupled to drain path 624. Drain path 624 is coupled to reservoir 108 and may supply make up fluid to lines 606 and 610 through check valves 626 and 628, respectively. These make up fluid paths may also be used in place of fluid supply path 616 to supply hydraulic fluid to fluid meter 212 when it is operating in the secondary steering mode.

The present invention provides an automatically triggered and manually driven secondary steering system and should not be limited to the above-described configurations, but should be limited solely by the claims that follow.

We claim:

1. A secondary steering system for a vehicle, the vehicle having a steering controller operable to control the flow of fluid from a source of pressurized fluid to a fluid operated steering system, the steering controller having a valve assembly that is fluidly coupled to a source of pressurized fluid and a reservoir and which has a first position and a second operating position, a fluid actuated means for imparting follow-up movement to the valve assembly proportional to fluid flow through the valve assembly, the secondary steering system comprising:

- a multi-displacement fluid meter that comprises the fluid actuated means, the multi-displacement fluid meter having a full displacement operational configuration and a reduced displacement operational configuration;
- a fluid supply path for supplying fluid to the multi-displacement fluid meter when pressurized fluid is not being supplied to the valve assembly from the source of pressurized fluid; and
- means for automatically switching the operational configuration of the multi-displacement fluid meter in response to a fluid pressure signal from the source of pressurized fluid.

2. A secondary steering system as defined by claim 1 wherein the fluid supply path is in fluid communication with the valve assembly and the reservoir, the fluid supply path is adapted and constructed to transmit fluid from the reservoir to the valve assembly.

3. A secondary steering system as defined by claim 2 wherein the fluid supply path is provided with a check valve to prevent pressurized fluid from flowing directly from the source of pressurized fluid, through the fluid supply path to the reservoir.

4. A secondary steering system as defined by claim 3 wherein the means for automatically switching comprises a two-position fluid pressure sensing valve that is fluidly positioned between the valve assembly and the multi-displacement fluid meter for selecting the displacement configuration of the fluid meter in response to the fluid pressure signal from the source of pressurized fluid.

5. A secondary steering system as defined by claim 4 wherein the fluid pressure sensing valve is provided with a biasing means for biasing the pressure sensing valve into a position for selecting the reduced displacement operational configuration of the multi-displacement fluid meter.

6. A secondary steering system as defined by claim 5 wherein the fluid pressure sensing valve is provided with a fluid sensing path that is fluidly coupled to the source of pressurized fluid for transmitting the fluid pressure signal, the fluid sensing path balances the fluid pressure sensing valve against the biasing means, when the source of pressurized fluid supplies pressurized fluid to the valve assembly, the fluid pressure signal in the fluid sensing path drives the fluid pressure sensing valve into a second position for selecting the full displacement operational configuration of the multi-displacement fluid meter.

7. A secondary steering system as defined by claim 6 wherein the biasing means comprises a spring.

8. A self-propelled work vehicle, the vehicle having a supporting structure to which is mounted ground engaging means that are used for propelling the vehicle, the supporting structure is also provided with a prime mover which is operatively coupled through a suitable transmission to the ground engaging means for propelling the vehicle; the vehicle comprising:

- a fluid operated steering assembly for steering the vehicle, the steering assembly is provided with a steering controller operable to control, the flow of fluid from a source of pressurized fluid to at least one fluid operated steering cylinder, the steering controller having a valve assembly that is fluidly coupled to a source of pressurized fluid and a reservoir, the controller having a first position and a second operating position, a fluid actuated means for imparting follow-up movement to the valve assembly proportional to fluid flow through the valve assembly, a multi-displacement fluid meter that comprises the fluid actuated means, the multi-displacement fluid meter having a full displacement operational configuration and a reduced displacement operational configuration;
- a fluid supply path for supplying fluid to the multi-displacement fluid meter when pressurized fluid is not being supplied to the valve assembly from the source of pressurized fluid; and
- means for automatically switching the operational configuration of the multi-displacement fluid meter in response to a fluid pressure signal from the source of pressurized fluid.

9. A self-propelled work vehicle as defined by claim 8 wherein the fluid supply path is in fluid communication with the valve assembly and the reservoir, the fluid supply path is adapted and constructed to transmit fluid from the reservoir to the valve assembly.

10. A self-propelled work vehicle as defined by claim 9 wherein the fluid supply path is provided with a check valve to prevent pressurized fluid from flowing directly from the source of pressurized fluid, through the fluid supply path to the reservoir.

11. A self-propelled work vehicle as defined by claim 10 wherein the means for automatically switching comprises a two-position fluid pressure sensing valve that is fluidly positioned between the valve assembly and the multi-displacement fluid meter for selecting the displacement configuration of the fluid meter in response to the fluid pressure signal from the source of pressurized fluid.

12. A self-propelled work vehicle as defined by claim 11 wherein the fluid pressure sensing valve is provided with a biasing means for biasing the pressure sensing valve into a position for selecting the reduced displacement operational configuration of the multi-displacement fluid meter.

13. A self-propelled work vehicle as defined by claim 12 wherein the fluid pressure sensing valve is provided with a fluid sensing path that is fluidly coupled to the source of pressurized fluid for transmitting the fluid pressure signal, the fluid sensing path balances the fluid pressure sensing valve against the biasing means, when the source of pressurized fluid supplies pressurized fluid to the valve assembly, the fluid pressure signal in the fluid sensing path drives the fluid pressure sensing valve into a second position for selecting the full displacement operational configuration of the multi-displacement fluid meter.

14. A self-propelled work vehicle as defined by claim 13 wherein the biasing means comprises a spring.

* * * * *